(12) United States Patent
Kramlich

(10) Patent No.: US 7,817,001 B2
(45) Date of Patent: Oct. 19, 2010

(54) ACTUATING DEVICE HAVING MEANS FOR BLOCKING MOVEMENTS

(75) Inventor: Andreas Kramlich, Schweinfurt (DE)

(73) Assignee: Preh GmbH (DE)

( * ) Notice: Subject to any disclaimer, the term of this patent is extended or adjusted under 35 U.S.C. 154(b) by 239 days.

(21) Appl. No.: 11/949,727

(22) Filed: Dec. 3, 2007

(65) Prior Publication Data

US 2008/0190235 A1     Aug. 14, 2008

Related U.S. Application Data

(63) Continuation of application No. PCT/EP2006/005308, filed on Jun. 2, 2006.

(30) Foreign Application Priority Data

| Jun. 2, 2005 | (DE) | .................. 10 2005 025 826 |
| Sep. 9, 2005 | (DE) | .................. 10 2005 042 883 |

(51) Int. Cl.

| H01F 3/08 | (2006.01) |
|---|---|
| H01F 7/08 | (2006.01) |
| H01F 3/00 | (2006.01) |
| H01F 7/00 | (2006.01) |
| H01H 9/20 | (2006.01) |
| H01H 9/00 | (2006.01) |
| H01H 9/28 | (2006.01) |
| G05G 5/06 | (2006.01) |

(52) U.S. Cl. .................. 335/280; 335/77; 335/167; 335/168; 335/179; 335/229; 335/230; 200/43.11; 74/527

(58) Field of Classification Search .................. 341/35; 200/43.11, 43.16, 318, 320; 318/626, 628; 335/68, 77, 167–168, 170, 172, 174, 179, 335/229, 230, 272, 280; 70/27.6, 278.1, 70/413; 74/110, 527

See application file for complete search history.

(56) References Cited

U.S. PATENT DOCUMENTS

| 2,849,571 | A | * | 8/1958  | Duffing    | 335/170 |
|-----------|---|---|---------|------------|---------|
| 3,757,551 | A |   | 9/1973  | Willach    |         |
| 4,026,048 | A |   | 5/1977  | Hill et al.|         |
| 4,078,709 | A | * | 3/1978  | Jenkins    | 226/180 |
| 5,014,030 | A | * | 5/1991  | Aston      | 335/228 |
| 5,969,588 | A | * | 10/1999 | Nelson     | 335/229 |
| 6,094,953 | A | * | 8/2000  | Evans      | 70/278.1|
| 6,229,421 | B1| * | 5/2001  | Floyd et al.| 335/253|
| 6,339,419 | B1| * | 1/2002  | Jolly et al.| 345/156|
| 6,377,146 | B1| * | 4/2002  | Batteux    | 335/280 |
| 6,404,354 | B1|   | 6/2002  | Decker et al.|       |
| 6,452,119 | B1|   | 9/2002  | Gessner    |         |

(Continued)

FOREIGN PATENT DOCUMENTS

DE        3319417 A1        12/1984

(Continued)

*Primary Examiner*—Lincoln Donovan
*Assistant Examiner*—Mohamad A Musleh
(74) *Attorney, Agent, or Firm*—Cantor Colburn LLP

(57) ABSTRACT

In actuating devices such as, e.g., multifunctional actuators, it is necessary in many cases to block at least one specific direction of movement. A simple and reliably operating device is proposed for this purpose, which uses an electromagnet to bring a ball from a rest position into a blocking position. In the blocking position, the ball mechanically blocks the relative movement between two parts.

16 Claims, 5 Drawing Sheets

U.S. PATENT DOCUMENTS

| | | | |
|---|---|---|---|
| 6,578,447 B1 * | 6/2003 | Fraser | 74/527 |
| 6,843,356 B2 | 1/2005 | Oster | |
| 2005/0110347 A1 | 5/2005 | Shirakawa | |

FOREIGN PATENT DOCUMENTS

| | | |
|---|---|---|
| DE | 42 40 298 A1 | 6/1994 |
| DE | 100 22 450 A1 | 12/2001 |
| DE | 10120618 A1 | 10/2002 |
| DE | 10304804 A1 | 8/2003 |
| DE | 10234512 A1 | 2/2004 |
| EP | 1069490 A2 | 1/2001 |
| EP | 1 484 661 A1 | 12/2004 |

* cited by examiner

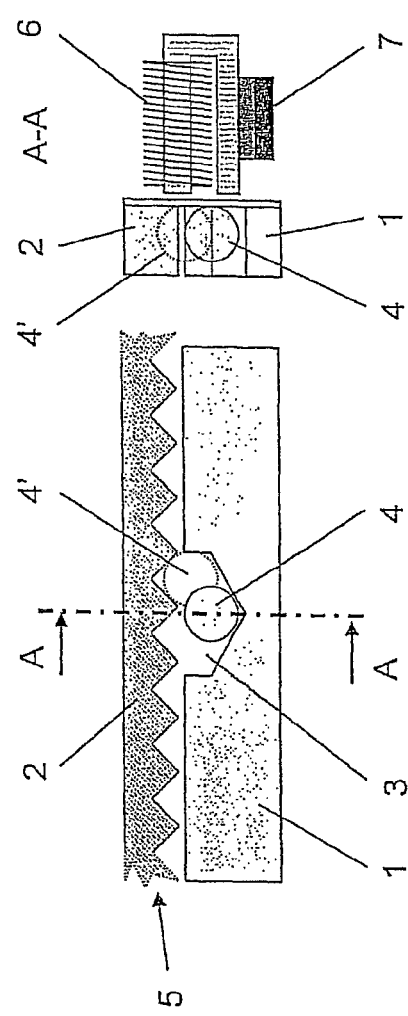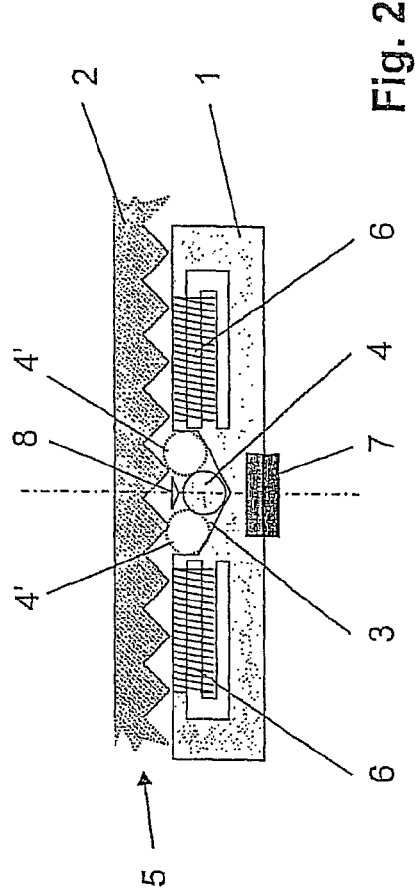

ACTUATING DEVICE HAVING MEANS FOR BLOCKING MOVEMENTS

This nonprovisional application is a continuation of International Application No. PCT/EP2006/005308, which was filed on Jun. 2, 2006, and which claims priority to German Patent Application No. DE 102005025826, which was filed in Germany on Jun. 2, 2005, and to German Patent Application No. DE 102005042883, which was filed in Germany on Sep. 9, 2005, and which are all herein incorporated by reference.

BACKGROUND OF THE INVENTION

1. Field of the Invention

The present invention relates to an actuating device having means for blocking movements of an actuating device.

2. Description of the Background Art

Actuating devices of this type are employed, e.g., in motor vehicles, to operate a system, e.g., an air conditioning system and/or an audio system and/or a navigation device. The actuating devices communicate further, e.g., via a computer unit with a display. As a rule, they have defined haptics, which can change with the change in switching states, and are prior in the art in the form of, e.g., rotary knobs, rocker switches, and joysticks and optionally as combinations of said means.

German Patent Application No. DE 102 34 512 A1 discloses an actuating device with a rotary knob, in which guide races, each of which has a channel with a different height, are provided for haptics realization. In the guide races, balls transmit an oscillating movement to the rotary knob.

German Patent Application No. DE 100 22 450 A1 discloses a control unit for controlling a pointer on a display unit; the control unit consists of a lower shell and an upper shell, whereby a sensor unit to detect the force acting on the control unit is disposed in the lower shell. A control unit evaluates the signals from the sensors.

Blocking means, however, are not described in these publications.

It is desirable or necessary in some cases, e.g., depending on the position of the actuating device, to restrict individual movement options in order to prevent faulty operations. To this end, German Patent Application No. DE 101 20 618 A1, which corresponds to U.S. Pat. No. 6,843,356, proposes providing two independently triggered stop mechanisms, acting on a control shaft, at an actuating device, whereby the one stop mechanism restricts rotation to the left and the other, rotary movement to the right. For this purpose, in each case, a clip-like ring with internal toothing is disposed around an annular element attached to the control shaft and having outer toothing. The ring can be influenced by an electromagnet so that the internal toothing and external toothing do or do not mesh. This prior-art stop mechanism requires a relatively large amount of space and is susceptible to wear and tear.

SUMMARY OF THE INVENTION

It is therefore an object of the present invention to provide an actuating device having means for blocking movements, whereby the device is simple and compact in structure and thereby is robust and not susceptible to failure.

In an embodiment of the present invention, the actuating device comprises at least one ball and at least one assigned electromagnet. The ball is made of a magnetizable material. The ball is taken from a rest position to a blocking position by activation of the electromagnet by application of an electric voltage. This is assured by appropriate orientation of the electromagnet. In the blocking position, the ball is kept between the first part and the second part, so that relative movement between these in a specific direction is not possible. For example, the first part is a housing and the second part a rotary knob, a slider, or a rocking lever.

The blocking means have a very simple structure and therefore can be manufactured at a reasonable cost. Balls and electromagnets can be made very small, so that the actuating device can be built as very compact overall. Provided the ball is in its rest position, no forces produced by the blocking means act on the second part, so that the haptics of the actuating device are not influenced by this. A so-called adhesive effect does not occur, because movement opposite to the blocking direction is free and the ball immediately reaches the rest position by deactivation of the electromagnet.

The actuating device is provided with the conventionally necessary sensors and/or contacts, so that the blocking device can be programmed simply with respect to the requirements.

The tooth array and the recess in an embodiment, are simple to realize during the manufacture of the parts, e.g., by injection molding, and enable blocking in that the ball is held between two teeth by the electromagnet. In this case, the tooth array is dimensioned depending on the diameter of the ball so that part of the ball projects from the plane formed by the tooth tips. This part of the ball during movement of the second part then strikes the recess wall located in the direction of motion, so that further movement in this direction is prevented. This design is especially suitable for blocking rotary and linear movements.

A single ball with the assigned electromagnet is especially simple and cost-effective.

A ball with two assigned electromagnets permits the selective blocking of one of the directions of movement.

A reset element assures that movement opposite to the blocking direction is free.

A permanent magnet assures that also in the event of, e.g., shocks and/or centrifugal forces, the ball is securely held in the rest position when the electromagnet is inactive. In this case, the electromagnet is dimensioned such that it can overcome in addition the forces of the permanent magnet.

A rocking lever can be blocked especially simply and reliably with the use of the ball and the associated electromagnet.

In a staggered arrangement of electromagnets, these are affixed more closely to the assigned balls.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 1 shows a schematically depicted actuating device for rotary or linear movement with a ball and an electromagnet on an enlarged scale;

FIG. 2 shows another schematically depicted actuating device for rotary or linear movement with a ball and two electromagnets on an enlarged scale;

DETAILED DESCRIPTION

Figure 3:
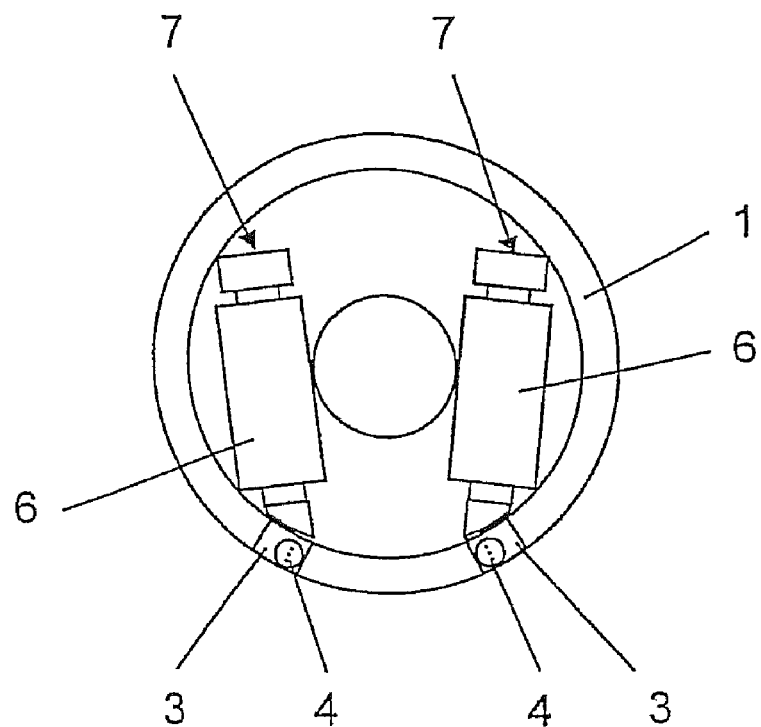
FIG. 3 shows a horizontal section through a rotating actuator with two balls and two electromagnets.

According to FIG. 1, a first part 1 of an actuating device is mounted a short distance below a second part 2 such that parts 1, 2 just avoid contact. Second part 2 is slidable relative to first part 1.

A groove-shaped recess 3 is incorporated into first part 1 on the top side facing second part 2. In this regard, the cross section of recess 3 is formed V-shaped out of four straight lines—two parallel sides and the V as a base attached at the bottom thereto. The blocking means have a ball 4 and an electromagnet 6. Ball 4 is seated loose in recess 3. The width and depth of recess 3 correspond in each case to at least the diameter of ball 4; the length in the direction of movement of the relative slidability corresponds here approximately to the twofold diameter of ball 4. Second part 2 on its side facing first part 1 has a tooth array 5, the distance between teeth corresponding approximately to the diameter of ball 4. As is evident from the sectional view A-A of FIG. 1, an electromagnet 6 is disposed in the center on a long side of recess 3, so that in the activated state the magnetic field acts predominantly in the gap between first part 1 and second part 2. A permanent magnet 7 acts in the area of the base of recess 3.

The actuating device is provided with sensors and/or contacts, which are not shown.

During operation of the actuating device in one direction, i.e., during relative movement of second part 2, a signal, which releases an electric voltage to electromagnet 6 and activates said magnet, is triggered at a predefined position of second part 2. As a result, ball 4 is brought from a rest position in the base of recess 3 to a blocking position between two teeth of tooth array 5, part of ball 4 projecting furthermore from tooth array 5 into recess 3. With further movement of the actuating device, ball 4 is taken along in tooth array 5 and pressed against the corresponding side of recess 3, so that movement for this direction is blocked, as is made clear by ball 4' depicted by the dotted lines. By actuation of the corresponding switching operations and/or movement of second part 2 in the opposite direction, the voltage to electromagnet 6 is interrupted, so that ball 4' returns to its rest position due to gravity. The latter is supported by permanent magnet 7, which is attached below electromagnet 6. These sequences apply independent of the direction of motion.

Another exemplary embodiment of the actuating device according to FIG. 2 differs from the above description only in the following: In first part 1, electromagnet 6 is disposed at each side of recess 3, therefore a total of two, so that in the activated state the magnetic field acts in direction of the associated side. Permanent magnet 7 is attached here below the base of recess 3. The length of recess 3 corresponds approximately to three times the diameter of ball 4 and the depth approximately to 1.5 times the diameter. A reset element 8 with a triangular cross section is disposed in recess 3 in the center between the two electromagnets 6, so that its longest side is in the same plane as the top edge of first part 1.

In this design, the function depends on the direction of motion of second part 2: If second part 2 is moved to the right according to FIG. 2, upon reaching a specific position the right electromagnet 6 is activated, so that ball 4 is brought into the right blocking position 4', shown by the dotted line. This blocks further movement of second part 2 to the right, whereas an opposite motion to the left is largely free also if right electromagnet 6 is activated; in the latter case, only engagement by ball 4, which is then forced downward by reset element 8, is discernible. An unintentional blocking in the opposite direction is reliably prevented.

If the second part moves to the left, the statements just made apply accordingly for the reverse direction.

The position of the actuating device is shown in FIGS. 1 and 2 so that first part 1 is disposed below second part 2. Any other position of the device can be used with appropriate arrangement and design of permanent magnets 7 and electromagnets 6.

Figure 4:
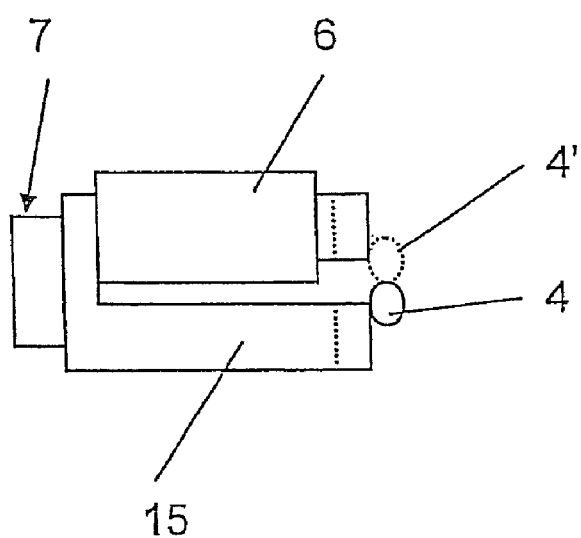
FIG. 4 shows an electromagnet in which a permanent magnet acts on two legs of a U-shaped iron core.

A rotary actuator, in which two electromagnets 6 are disposed in first part 1, is evident from FIG. 3. Each electromagnet 6 is assigned a ball 4 and a recess 3. As can be seen especially well in FIG. 4, electromagnet 6 is attached to a leg of a U-shaped iron core 15. Permanent magnet 7 is affixed on the outside at the base of the iron core, which connects the two legs, so that it acts on both legs. Each electromagnet is affixed in first part 1 so that in the plan view the legs of iron core 15 are perpendicular one above the other. In this way, permanent magnet 7 acts via the leg on which electromagnet 6 is affixed, on ball 4' in the blocking position, and via the other leg on ball 4 in the rest position, so that ball 4 is kept in each case in one of the two positions by permanent magnet 7. The change from the rest position to the blocking position occurs by a current pulse on electromagnet 6; the reverse change occurs by a current pulse with a reverse polarity.

Figure 5:
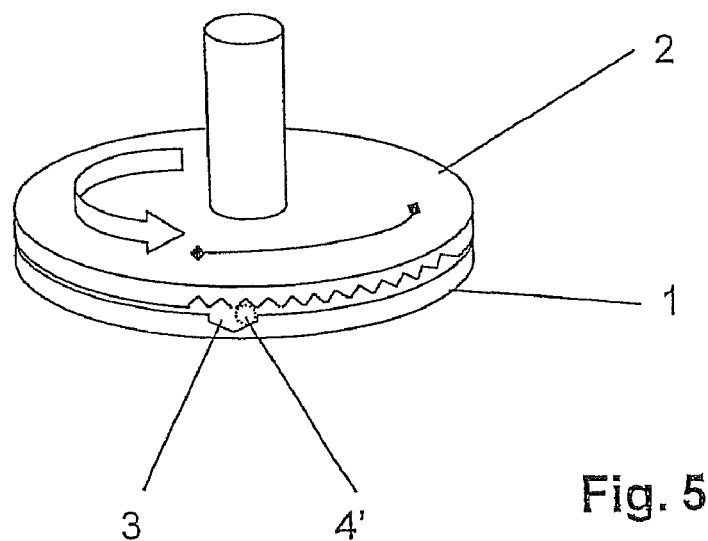
FIG. 5 shows a basic sketch of a rotating actuator.

A rotary actuator, which comprises the details according to FIG. 1 or FIG. 2, is shown greatly simplified as the actuating device in FIG. 5; the electromagnet(s) 6 is/are not shown here. First part 1 here is a circular disk as part of a housing, which is not shown and in which recess 3 (shown open on the side for the sake of clarity) is formed in the immediate vicinity of the edge. Second part 2 is also a circular disk with approximately the same diameter and belongs to a rotary knob. Tooth array 5 is disposed on part of the circumference at the edge of second part 2. Ball 4' is shown in the blocking position for a counterclockwise rotation.

Figure 6:
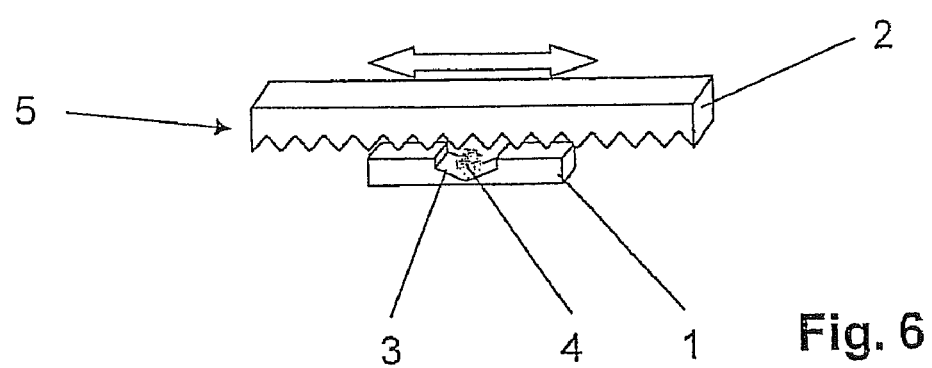
FIG. 6 shows a basic sketch of a linear actuator.

A linear actuator, which comprises the details according to FIG. 1 or FIG. 2, is shown greatly simplified as the actuating device in FIG. 6; the electromagnet(s) 6 is/are not shown here. First part 1 here is a bar-like plate as part of a housing, which is not shown and in which recess 3 is formed. Second part 2 is a gear rod, which has tooth array 5 on one side, and is part of a slider. Ball 4 is in the rest position.

Figure 7:
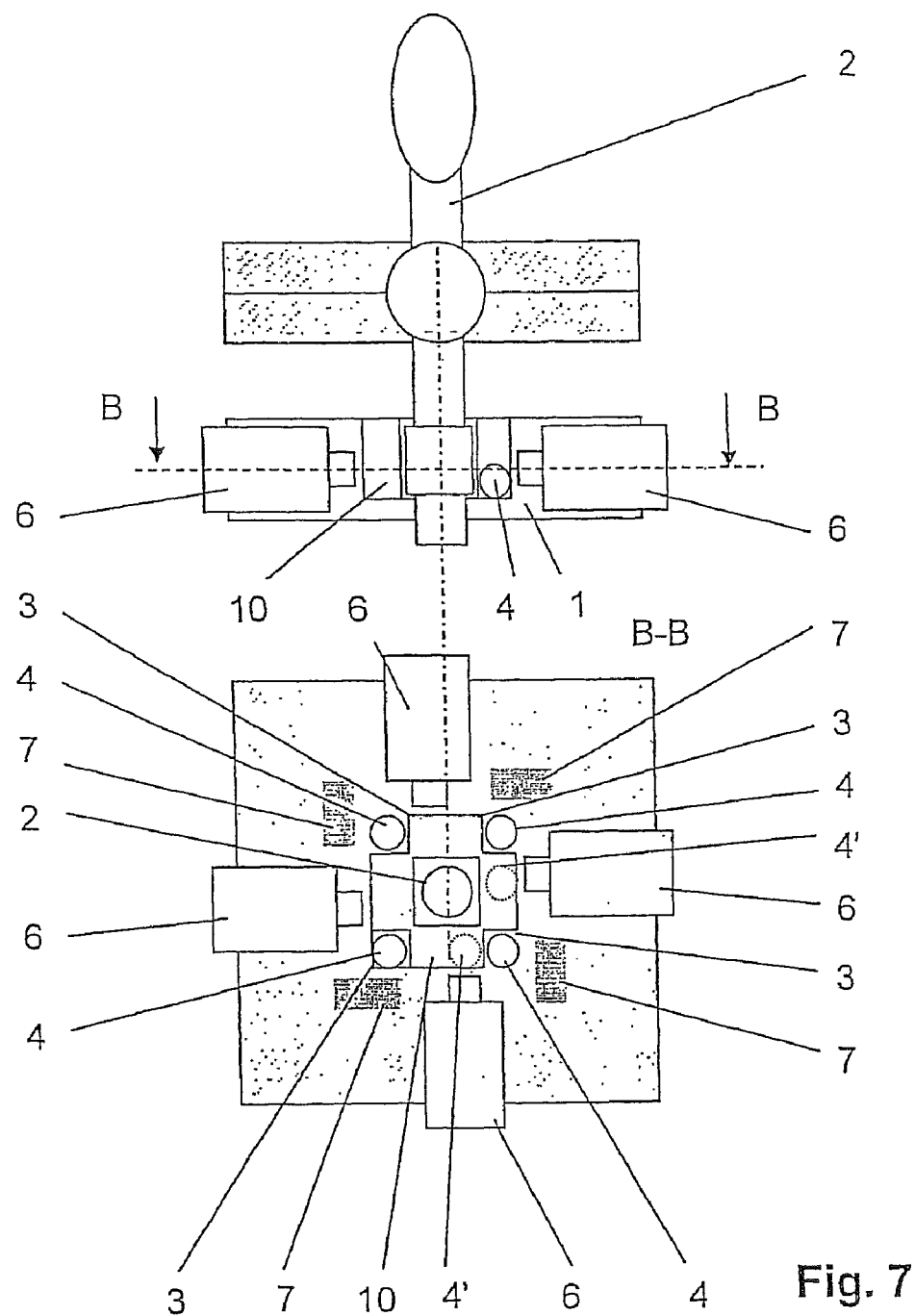
FIG. 7 shows a joystick with blocking means.

FIG. 7 shows a joystick with blocking means. First part 1 here is a rectangular plate, in which a typical cruciform gate 10 is formed. Second part 2 is a rocking lever, which is placed in first part 1, as is typical for a joystick, so that it can be tilted within gate 10, here in four directions offset at right angles. The joystick is provided with sensors and/or contacts, which are not shown. Four electromagnets 6 are disposed on first part 1. In this case, each of the electromagnets 6 is oriented, so that the magnetic field present in the activated state acts in an associated end region of one of the arms of the cross. Electromagnets 6, opposite each other, are offset parallel to their longitudinal axes so that these are offset to the axes of first part 1. Each electromagnet 6 is assigned a ball 4, which with an inactive electromagnet 6 is placed in the rest position in recess 3 formed between two neighboring arms of the cross. Recess 3 is formed, e.g., as a semicircle, so that, on the one hand, the function of gate 10 is not disrupted and, on the other, ball 4 can leave the recess only in one direction. Each recess 3 is assigned a permanent magnet 7.

During operation of the joystick, at least one of the electromagnets 6 is activated in appropriate switching states and positions of second part 2. By this means, the associated ball 4—for the right electromagnet 6 this is the top right ball 4—is taken from the rest position in recess 3 into the position shown by the dotted lines (here right ball 4') in gate 10 between first part 1 and second part 2, so that the movement of second part 2 is blocked in this direction. As soon as the switch again allows this direction, the voltage to electromagnets 6 is interrupted, and permanent magnet 7 returns ball 4' to the rest position.

Figure 8:
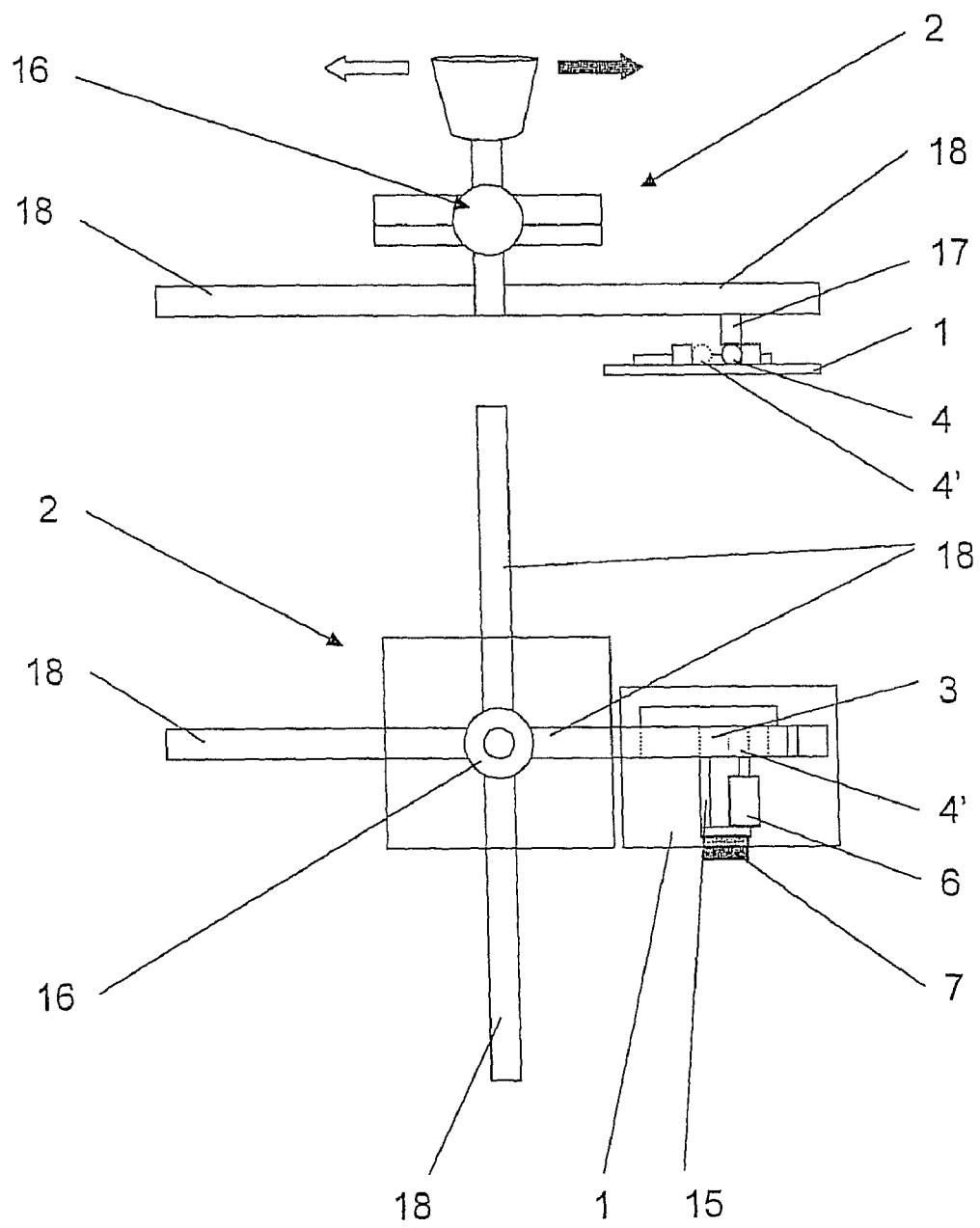
FIG. 8 shows another joystick with blocking means.

In the case of the joystick shown in FIG. 8, the rocking lever as second part 2 is mounted not in first part 1, shown only partially here, but in a joint 16, which is disposed approximately in the middle of the length of the rocking lever and is affixed in a housing. Four arms 18, arranged in the form of a square cross, are attached at a lower end of the rocking lever, whereby arms 18 extend in a respective tilting direction of the rocking lever. Each arm 18 in the area of its outer end has an extension 17 pointing to first part 1. Said extension projects in the direction of recess 3, which is formed here block-shaped in first part 1 below extension 17, so that the longitudinal axis of recess 3 runs parallel to the associated arm 18 and one end of recess 3 is located directly beneath extension 17 and an opposite end is located to the side of extension 17. On the long side of recess 3, electromagnet 6 with permanent magnet 7 is disposed according to FIG. 4.

It is specifically pointed out that in FIG. 8 the blocking means are shown only for one of the arms 18.

When the rocking lever is tilted, extension 17 enters recess 3, if the corresponding ball 4 is in the rest position. As soon as the tilting direction is to be blocked, ball 4 is brought into blocking position 4', so that during tilting in the appropriate direction, extension 17 presses against ball 4' and thus prevents this tilting motion.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An actuating device comprising:
   a first part;
   a second part movable relative to the first part;
   component for at least partial blocking of movements, the component comprising at least one ball and at least one electromagnet assigned to the ball,
   a recess formed in the first part, the recess having a base; at least one ball is placed in the recess; and
   a permanent magnet disposed so that it acts in the vicinity of the base of the recess;
   wherein, through activation of the electromagnets, the ball is slidable from a rest position to a blocking position between the first part and the second part in such a way that the movement of the second part is blocked at least partially.

2. The actuating device according to claim 1, wherein the second part on a side facing the first part is provided at least partially with a tooth array; the recess having a V-shaped cross section; and wherein, by activation of the electromagnet, the ball is moved in a direction towards the second part such that the ball engages in the tooth array.

3. The actuating device according to claim 2, wherein the second part is a circular disk; the circular disk has an outer rim; and the tooth array is disposed on the outer rim.

4. The actuating device according to claim 3, wherein a portion of the disk's circumference is provided with the tooth array.

5. The actuating device according to claim 1, wherein a single electromagnet transverse to the recess and a single ball are arranged.

6. The actuating device according to claim 1, wherein two electromagnets are disposed for each ball so that one magnet is assigned to each side of the recess.

7. The actuating device according to claim 6, wherein a reset element is disposed in the recess.

8. The actuating device according to claim 1, wherein the permanent magnet is disposed so that it acts alternatively on the ball, which is in the rest position or in the blocking position.

9. The actuating device according to claim 1, wherein the actuating device is a rotary actuator.

10. The actuating device according to claim 1, wherein the actuating device is a linearly slidable actuator.

11. The actuating device according to claim 1, wherein the actuating device is a rocking lever.

12. The actuating device according to claim 11, wherein a permanent magnet is assigned to each recess.

13. The actuating device according to claim 11, wherein four electromagnets, of which two each lie approximately opposite, and four balls are arranged.

14. The actuating device according to claim 11, wherein a longitudinal axis of two electromagnets, lying opposite, are arranged offset relative to each other.

15. The actuating device according to claim 1, wherein the second part is a rocking lever, the rocking lever is guided in a guide gate disposed on the first part, the gate allows for at least one direction of movement; a ball and an electromagnet being assigned to each direction of movement; wherein by activation of at least one of the electromagnets the ball is brought out of a recess into the guide gate between the rocking lever and the electromagnet.

16. The actuating device according to claim 1, wherein the second part is a rocking lever, which is mounted in a joint, wherein arms are attached at one end of the rocking lever, the arms extending in a directions of movement and each of which have an extension that acts together with the component for the at least partial blocking of movements.

* * * * *